No. 810,354. PATENTED JAN. 16, 1906.
M. L. & J. S. SCANLON & A. A. ARNOLD.
HOSE COUPLING.
APPLICATION FILED APR. 27, 1905.
2 SHEETS—SHEET 2.
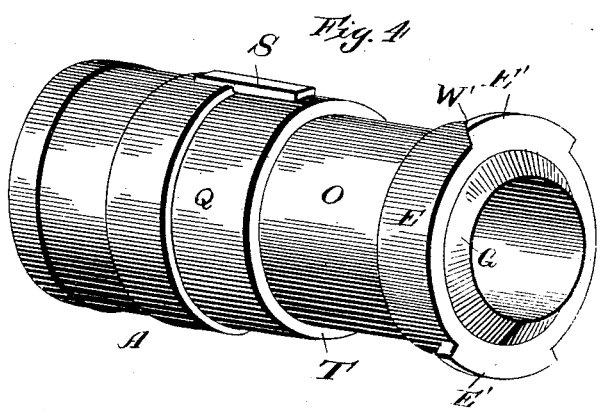
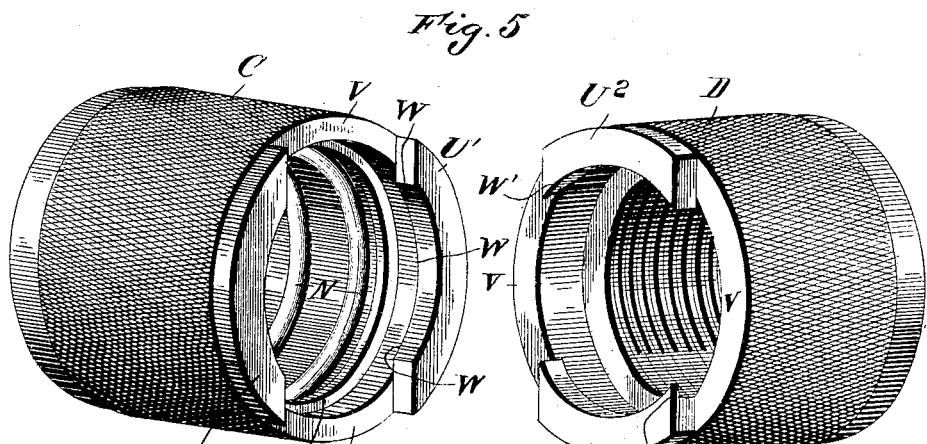
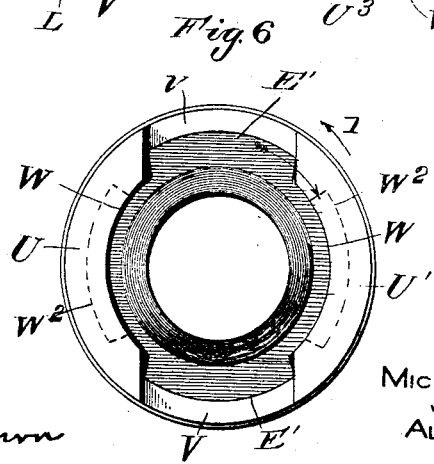
WITNESSES:
INVENTORS
MICHAEL L. SCANLON
JOHN S. SCANLON
ALLEN A. ARNOLD
BY
ATTORNEYS

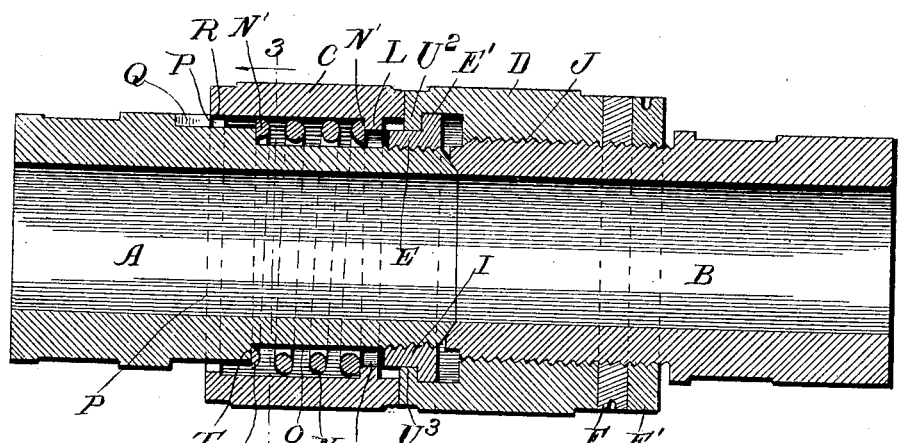
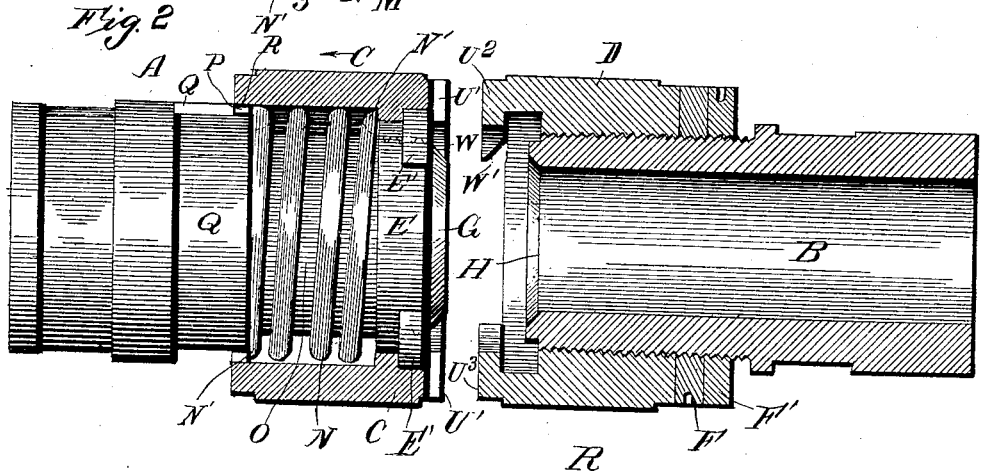
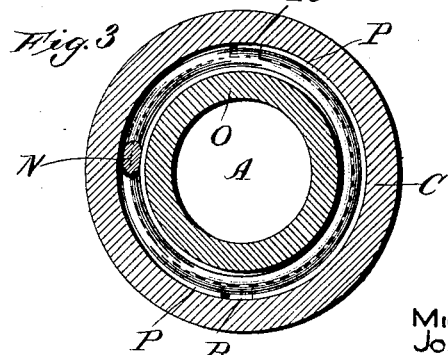

UNITED STATES PATENT OFFICE.

MICHAEL L. SCANLON, JOHN S. SCANLON, AND ALLEN A. ARNOLD, OF GALION, OHIO; SAID MICHAEL L. SCANLON AND JOHN S. SCANLON ASSIGNORS OF ONE-FOURTH OF THEIR RIGHT TO MARY E. SCANLON, OF GALION, OHIO.

HOSE-COUPLING.

No. 810,354.   Specification of Letters Patent.   Patented Jan. 16, 1906.

Application filed April 27, 1905. Serial No. 257,603.

*To all whom it may concern:*

Be it known that we, MICHAEL L. SCANLON, JOHN S. SCANLON, and ALLEN A. ARNOLD, citizens of the United States, and residents of Galion, in the county of Crawford and State of Ohio, have invented a new and Improved Hose-Coupling, of which the following is a specification.

Our invention relates to means for rendering hose and pipe couplings water, air, and steam tight.

The object had in view is to provide a coupling of this character which shall not only be adapted for effecting an improved coupling of the parts, but be simple of construction and easy to operate.

The invention consists of the construction, arrangement, and combination of parts shown in the accompanying drawings, hereinafter fully described, and specifically pointed out in the claims.

In the drawings, Figure 1 is a longitudinal sectional view taken through our coupling with the two parts or end members thereof shown joined and locked together. Fig. 2 is a view, part in longitudinal section and part in elevation, of our coupling, but with the two end members thereof shown disconnected and in position for coupling. Fig. 3 is a transverse section taken on line 3 3 of Fig. 1. Fig. 4 is a detail perspective view of the male portion forming part of one end member of our improved coupling. Fig. 5 is a view showing detail perspective views of the two adjustable sleeves or female portions of our coupling, and Fig. 6 is a view in front elevation of one member of our coupling.

In the practice of our invention we employ sections of tubing A B, adapted for connection with hose or metal tubing, as may be desired, and arrange thereon sleeves C D. The section A is provided with a ring E, having spaced shoulders E', and the section B has arranged thereon jam-collars F F'.

In the following description the sections of tubing A B will be referred to as the "male" members of our coupling and the sleeves C D as the "female" members.

Upon reference to Figs. 1 and 2 it will be noticed that the abutting ends of the male members A B fit together substantially as with a ball or conical extension G on the member A, fitting into a similar-shaped socket H in the end of the member B. The ring E is provided with screw-thread adjustment I on the forward end of the male member A. The sleeve D has similar adjustment J on the male member B, and the jam-collars F F' have like adjustment, as shown. The sleeve C has an internal flange L, having an opening M, adapted to receive the ring E when the sleeve is forced forward by tension of a spring N on the reduced end portion O of the male member A. A flange P (shown by dotted lines in Fig. 1, see also Fig. 3) is formed on the inner rear end of the sleeve C, the same being fashioned conforming to the adjacent circular surface Q of the member A. The flange P is cut away, having opposite openings R adapted to receive a suitable rib S on one side of the male member A when the sleeve C is pushed back, as indicated by the arrow in Fig. 1. At the inner end of the reduced portion O on the member A a shoulder T is provided for the purpose appearing farther on.

Upon reference to Fig. 1 it will be noticed that the outer side of the ends N' of the spring N are flattened and adapted to provide bearing against the inner edge of the ring E, the shoulder T, and the flanges L P of the sleeve C when the latter is at normal uncoupling position. (Shown by Fig. 2.) It will be further noticed that the spring N is confined on the male member A by the ring E and the shoulder T. (See Figs. 1 and 2.) By means of the construction shown and just described the spring N is retained in place and the sleeve C held forced forward by tension of the spring, ready for coupling of the two ends A B of the joint, as will be understood farther on.

The sleeves C D (see Fig. 5) are provided, respectively, with opposite extensions U U' and $U^2$ $U^3$ on their abutting ends, leaving spaces V between the ends of the extensions. These extensions are constructed with their inner edges overhanging or projecting into the opening through the sleeves, as indicated at W, and opposite or forward ends of the extensions $U^2$ $U^3$ on the sleeve D may be made slightly inclined on their inner sides at W' to facilitate locking engagement thereof with the shoulders E' on the ring E.

In the use of our improved pipe-coupling, assuming the parts to be at normal position, (shown in Fig. 2,) the sleeve C is turned on the male member A, leaving the shoulders E' opposite the spaces V, as shown in Fig. 6. The sleeve is now forced backward against tension of the spring N until the shoulders E' on the ring E stand at forward position beyond the extensions U U'. In this position of the parts the sleeve C is free to be turned, as indicated by the arrow 1 in Fig. 6, leaving the shoulders E' on the ring E adjusted with respect to the sleeve to position indicated by dotted lines W² in Fig. 6.

In effecting coupling of the two ends of the joint the jam-collars F F' and the sleeve D are adjusted backward on the male member B. The sleeves' extensions U² U³ are then arranged into the spaces V on the sleeve C, the latter being held to position of its adjustment by entrance of the rib S into one of the openings R in the adjacent end of the sleeve C.

Now with the two sections or ends of the joint arranged as stated above, upon removing pressure from the sleeve C the latter will be forced forward on the male member A by tension of the spring N, and thereby draw the shoulders E' tightly against the face or outer surface of the extensions U U' at the position thereof shown in Fig. 6. Locking together of the end sections of the coupling is now effected by rotation of the sleeve C on the male member A by engagement of the extensions U U' and U² U³, and turning action imparted to the sleeve D. This operation of the parts through means of the screw-thread connection of the male member B and the sleeve D will adjust the latter forward and at the same time adjust the sleeves C D to position, leaving the shoulders E' into locking engagement with the inner or projecting ends W of the extensions U² U³, as shown in Fig. 1. These parts may now be secured by forward adjustment of the jaw-collars F F', as will be understood. When coupling of the two sections in the joint is effected, the conical end G on the male member A will be firmly and water-tight seated in the socket H at the forward end of the male member B. In disconnecting the two sections in the joint the jam-collars F F' are adjusted backwardly from the sleeve D, and thereby permit free rotation of the sleeves C D, which action will change relative position of the parts, leaving the shoulders E' drawn into the spaces V on the sleeve C, and consequently opposite the similar spaces V on the sleeve D. The shoulders being thus removed from locking engagement with the inner or projecting edges W of the extensions U² U³ on the sleeve D obviously the two end sections of the joint are thereby unlocked and free to be separated.

Having thus described our invention, what we claim as new, and desire to secure by Letters Patent, is—

1. The combination in a coupling, of abutting male members, a ring on one of said members having shoulders oppositely located thereon, a spring on this member, located in rear of the ring and confined in place by said ring and a shoulder on this member, a sleeve on the same member, supported by tension of the spring, an inner flange on the sleeve adapted for engagement with the spring, extensions on the sleeve, having inwardly-projecting edges, a similar sleeve, having adjustment on the other male member of the coupling, and extensions on the latter sleeve, having inwardly-projecting edges, the said sleeve extensions being spaced apart adapted to fit together, substantially as described.

2. The combination in a coupling, of male members, sleeves on the male members having separating adjustment and one thereof being adapted to be yieldingly held under tension, extensions on the abutting ends of the sleeves, having inwardly-projecting edges, a spring confined on one male member, supporting its sleeve under tension, and a ring on one male member having shoulders adapted for locking engagement with the inner projecting edges of extensions on a sleeve supported on the other male member, substantially as described.

3. The combination in a coupling, of male members, sleeves on the male members, having separating adjustment and one thereof being adapted to be yieldingly held under tension, extensions on the abutting ends of the sleeves, having inwardly-projecting edges, a spring confined on one male member, supporting its sleeve under tension, a ring on one male member having shoulders adapted for locking engagement with the inner projecting edges of the extensions on the other male member, adjustable jam-collars on one male member, a rib on the other male member, and means on the sleeve carried by said member adapted for engagement with the rib, when the sleeve is adjusted, substantially as described.

MICHAEL L. SCANLON.
JOHN S. SCANLON.
ALLEN A. ARNOLD.

Witnesses:
HENRY KNOTE,
J. M. TRACHT.